(12) United States Patent
Mires et al.

(10) Patent No.: US 10,928,203 B2
(45) Date of Patent: Feb. 23, 2021

(54) SELF-CONTAINED POSITIONING ASSEMBLY

(71) Applicant: ABL IP Holding LLC, Atlanta, GA (US)

(72) Inventors: Samuel Jeffrey Mires, Carmel, IN (US); Martin F. Lee, Nobelsville, IN (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/131,250

(22) Filed: Sep. 14, 2018

(65) Prior Publication Data

US 2019/0086213 A1    Mar. 21, 2019

Related U.S. Application Data

(60) Provisional application No. 62/559,889, filed on Sep. 18, 2017.

(51) Int. Cl.
| | |
|---|---|
| *G01C 21/20* | (2006.01) |
| *H04B 10/114* | (2013.01) |
| *G01S 1/04* | (2006.01) |
| *F21V 23/02* | (2006.01) |
| *G01S 11/12* | (2006.01) |
| *G01S 1/70* | (2006.01) |
| *F21V 33/00* | (2006.01) |

(52) U.S. Cl.
CPC ............ *G01C 21/206* (2013.01); *G01S 1/042* (2013.01); *H04B 10/1149* (2013.01); *F21V 23/023* (2013.01); *F21V 33/00* (2013.01); *G01S 1/70* (2013.01); *G01S 11/12* (2013.01)

(58) Field of Classification Search
CPC ......... G01C 21/206; G01S 1/042; G01S 1/70; G01S 11/12; H04B 10/1149; F21V 23/023; F21V 33/00
USPC ...... 455/41.1–41.2, 404.2, 456.1–457, 575.1
See application file for complete search history.

(56) References Cited

U.S. PATENT DOCUMENTS

| | | | |
|---|---|---|---|
| 3,052,369 | A  | 9/1962  | Taibi |
| 6,951,983 | B1 | 10/2005 | Gretz |
| 6,998,531 | B2 | 2/2006  | Hull |
| 7,053,297 | B2 | 5/2006  | Hull et al. |
| 7,057,106 | B2 | 6/2006  | Hull et al. |
| 7,145,075 | B2 | 12/2006 | Hull et al. |
| 7,186,913 | B2 | 3/2007  | Hull et al. |
| 7,381,891 | B2 | 6/2008  | Hull et al. |
| 7,432,440 | B2 | 10/2008 | Hull et al. |
| 7,639,160 | B2 | 12/2009 | Sabina et al. |

(Continued)

*Primary Examiner* — Michael Y Mapa
(74) *Attorney, Agent, or Firm* — Kilpatrick Townsend & Stockton LLP

(57) ABSTRACT

A self-contained positioning assembly includes a wiring compartment that is configured to receive external power, a power supply disposed within the wiring compartment that is configured to convert the external power to low voltage power, a housing, a conduit that couples the wiring compartment with the housing, an electronic positioning beacon disposed within the housing, and wiring that transmits the low voltage power from the power supply, through the conduit, to the electronic positioning beacon within the housing. The electronic positioning beacon is configured to receive the low voltage power and transmit electronic positioning signals in response.

22 Claims, 8 Drawing Sheets

(56) References Cited

U.S. PATENT DOCUMENTS

| | | |
|---|---|---|
| 8,636,385 B2 | 1/2014 | Fabbri et al. |
| 8,701,911 B2 | 4/2014 | Youssef et al. |
| 8,878,666 B2 | 11/2014 | Chu |
| 9,089,031 B2 | 7/2015 | Maa et al. |
| 9,398,422 B2 | 7/2016 | Zampini, II |
| 9,699,855 B2 | 7/2017 | Maa et al. |
| 2010/0064504 A1 | 3/2010 | Sabina et al. |
| 2014/0122017 A1 | 5/2014 | Chu |
| 2014/0167959 A1 | 6/2014 | Chu |
| 2014/0172354 A1* | 6/2014 | Chu ............... G01S 5/0231 702/150 |
| 2014/0274221 A1* | 9/2014 | Baschnagel ......... H04M 1/0274 455/573 |
| 2015/0084769 A1* | 3/2015 | Messier ............. G08B 21/0446 340/539.13 |
| 2015/0260823 A1* | 9/2015 | Hansen ................. G01S 1/042 342/450 |
| 2016/0088421 A1* | 3/2016 | Warner ................. H04B 3/548 455/41.2 |
| 2016/0225267 A1 | 8/2016 | DeBusk et al. |
| 2017/0013417 A1 | 1/2017 | Zampini, II |
| 2017/0064850 A1* | 3/2017 | Blase .................... G06F 3/041 |
| 2018/0068315 A1* | 3/2018 | Bergdale ................ G06Q 10/02 |

* cited by examiner

SELF-CONTAINED POSITIONING ASSEMBLY

CROSS REFERENCE TO RELATED APPLICATIONS

This application is a nonprovisional application of, and claims priority to U.S. Provisional Patent Application Ser. No. 62/559,889, filed 18 Sep. 2017 and incorporated herein by reference in its entirety for all purposes.

FIELD OF THE INVENTION

Embodiments of the invention relate to a self-contained assembly for housing components of electronic systems, such as Bluetooth beacons.

BACKGROUND

In some cases, it may be advantageous to establish exact, real-time location information in various environments. As one example, retailers may wish to establish real-time location information with a customer within their store. Based on the customer's location, the retailer may communicate with the customer and assist with locating particular items, promote specific products, or provide various other types of communication. Positioning information can normally be obtained through Global Positioning System (GPS) functionality. However, in indoor environments, GPS may not work or may be insufficiently accurate. Also, GPS is a "one way" system that merely transmits signals to a user device, enabling the user device to determine where it is, but in which the user device does not communicate its presence or location back to a host system.

In an indoor environment where GPS may not be ideal, luminaires installed within the environment may be equipped to provide real-time location information to various user devices, such as smartphones, cell phones, tablets, and various other user devices. One manner by which to do this is with visual light communication (VLC) technology. Generally, light sources such as LEDs can be modulated (brightened and dimmed) at a high enough rate or frequency to be invisible to the human eye but detectible by a camera on a smart mobile device, such as a smartphone or tablet. A different modulation pattern may be used in each installed luminaire so as to create a unique code for each fixture, from which each fixture can be uniquely identified, and/or from which information about the position of each such fixture can be obtained. With this information, the mobile device can determine its own location with respect to the fixtures within its field of view. In some installations, the mobile device can, for example, direct the user (e.g., the person operating the mobile device) to a desired area within a store in which the fixtures are installed.

However, VLC technology requires a direct line-of-sight between the luminaire and the camera of the user device. Sometimes, an insufficient number or quality of unique modulating light sources may be visible to the user device. And, like GPS, VLC may not return location information of the user device back to a host system. In such circumstances, an electronic positioning beacon—for example, a Bluetooth beacon that includes at least one Bluetooth module and at least one associated Bluetooth antenna—may be provided in the luminaire to provide location information. A Bluetooth beacon, which may be installed at or near a luminaire, can provide radio-frequency (RF) signals to the smartphone or tablet's Bluetooth receiver/transmitter.

This approach can operate under the Bluetooth Low Energy (BLE) communication protocol, and in such cases can be referred to as BLE positioning. Generally speaking, Bluetooth operates under the IEEE 802.15 communications standard. More specifically, BLE operates under further standards included in the Bluetooth 4.0 standard, as defined by the Bluetooth Special Interest Group (SIG), a standards organization.

BLE antennas are capable of providing adequate signal strength at some distance, such that a Bluetooth receiver on the user device can receive a signal from several BLE antennas at once. Unlike VLC technology, BLE beacons do not require a direct line-of-sight with a user device to be able to communicate with the user device. The BLE beacons may be used in conjunction with, or in place of, VLC technology. And, BLE beacons can establish two-way communication with user devices so that the presence, location and/or identity of the user devices can be obtained by a host system. The user device presence and/or location information can be used for a wide variety of purposes, such as generating user device traffic data, providing customized information to the user devices depending on user device location, type of device, user identity, etc.

One way to provide BLE beacons has historically been to incorporate them into luminaires—either into native luminaires (e.g., as built) or into existing luminaires, via a retrofit kit. In both cases, inclusion of BLE functionality in an environment is limited to the locations of the host luminaires themselves. Moreover, in the case of retrofitting existing luminaires with BLE functionality, the BLE retrofit kits must typically be customized for each different type of luminaire. Also, installing BLE retrofit kits at luminaires can limit the mechanical options available to optimize layout and/or orientation of the associated BLE beacons.

SUMMARY

Embodiments of the present invention relate to a self-contained positioning assembly that does not have to be installed within a luminaire. Rather, the self-contained positioning assembly can be located external to luminaires already provided to illuminate an environment, and/or separately from luminaires.

In one or more embodiments, a self-contained positioning assembly includes a wiring compartment that is configured to receive external power, a power supply disposed within the wiring compartment that is configured to convert the external power to low voltage power, a housing, a conduit that couples the wiring compartment with the housing, an electronic positioning beacon disposed within the housing, and wiring that transmits the low voltage power from the power supply, through the conduit, to the electronic positioning beacon within the housing. The electronic positioning beacon is configured to receive the low voltage power and transmit electronic positioning signals in response.

In one or more embodiments, a method of providing an electronic positioning beacon system includes providing a wiring compartment that is configured to receive external power, and providing a power supply within the wiring compartment. The power supply is configured to convert the external power to low voltage power. The method further includes providing a housing and an electronic positioning beacon disposed within the housing. The electronic positioning beacon is configured to receive the low voltage power and transmit electronic positioning signals in response. The method further includes coupling a conduit with the wiring compartment and with the housing, and coupling wiring with the power supply, through the conduit, and with the electronic positioning beacon, to enable transmission of the low voltage power from the power supply, through the wiring, to the electronic positioning beacon.

In one or more embodiments, a method of installing an electronic positioning beacon system includes receiving a wiring compartment with a power supply disposed therein, a housing, and an electronic positioning beacon disposed within the housing. The power supply is configured to convert the external power to low voltage power, a conduit couples the wiring compartment with the housing, and the electronic positioning beacon is configured to receive the low voltage power and transmit electronic positioning signals in response. Wiring couples the power supply with the electronic positioning beacon through the conduit, connecting the low voltage power from the power supply to the electronic positioning beacon. The method further includes coupling the wiring compartment with the external power.

BRIEF DESCRIPTION OF THE DRAWINGS

Embodiments are described in detail below with reference to the following figures, in which like numerals within the drawings and mentioned herein represent substantially identical structural elements.

DETAILED DESCRIPTION

Embodiments of the present invention relate to a self-contained positioning assembly that does not have to form part of, or be installed within, a luminaire. Rather, it can be located external to luminaires already provided to illuminate an environment. While the present embodiments are usually deployed indoors as an alternative to GPS based positioning, they may be deployed in any environment.

Figure 1A:
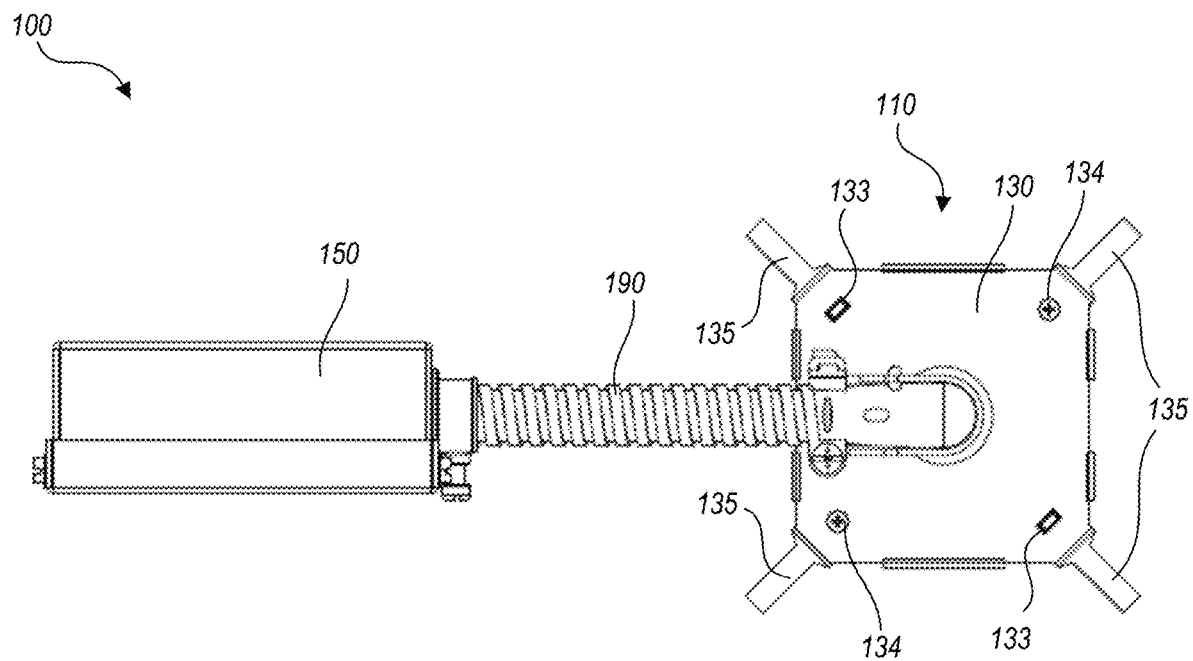
FIG. 1A is a top plan view of a self-contained positioning assembly, in accord with one or more embodiments.
Figure 1B:
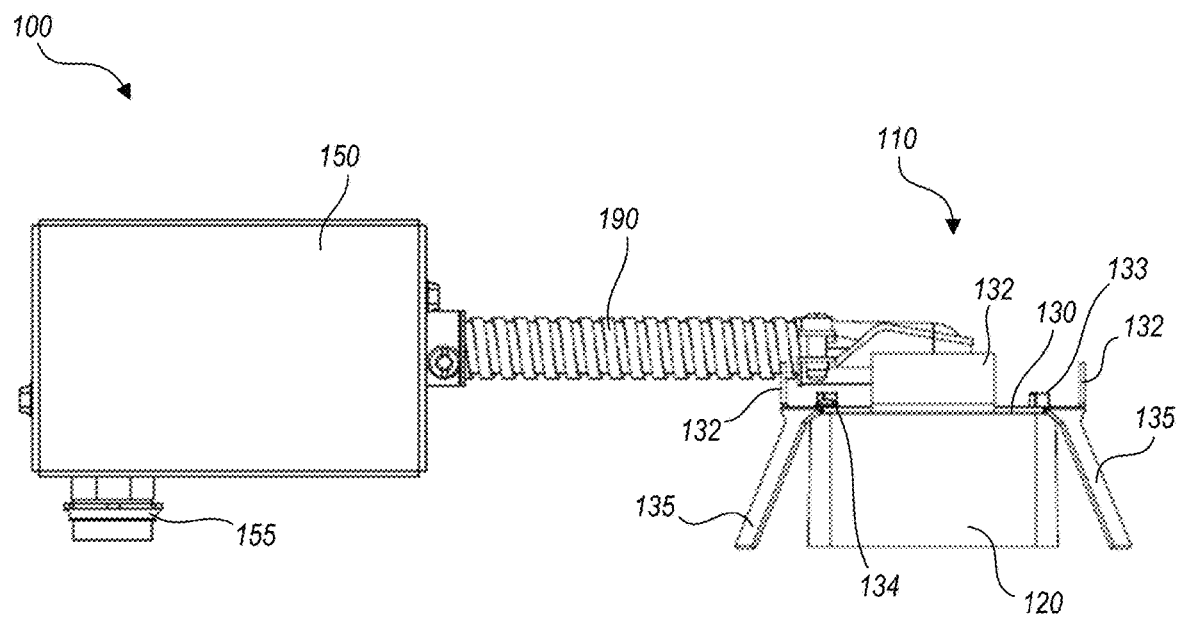
FIG. 1B is a side view of the self-contained positioning assembly of FIG. 1A.
Figure 1C:
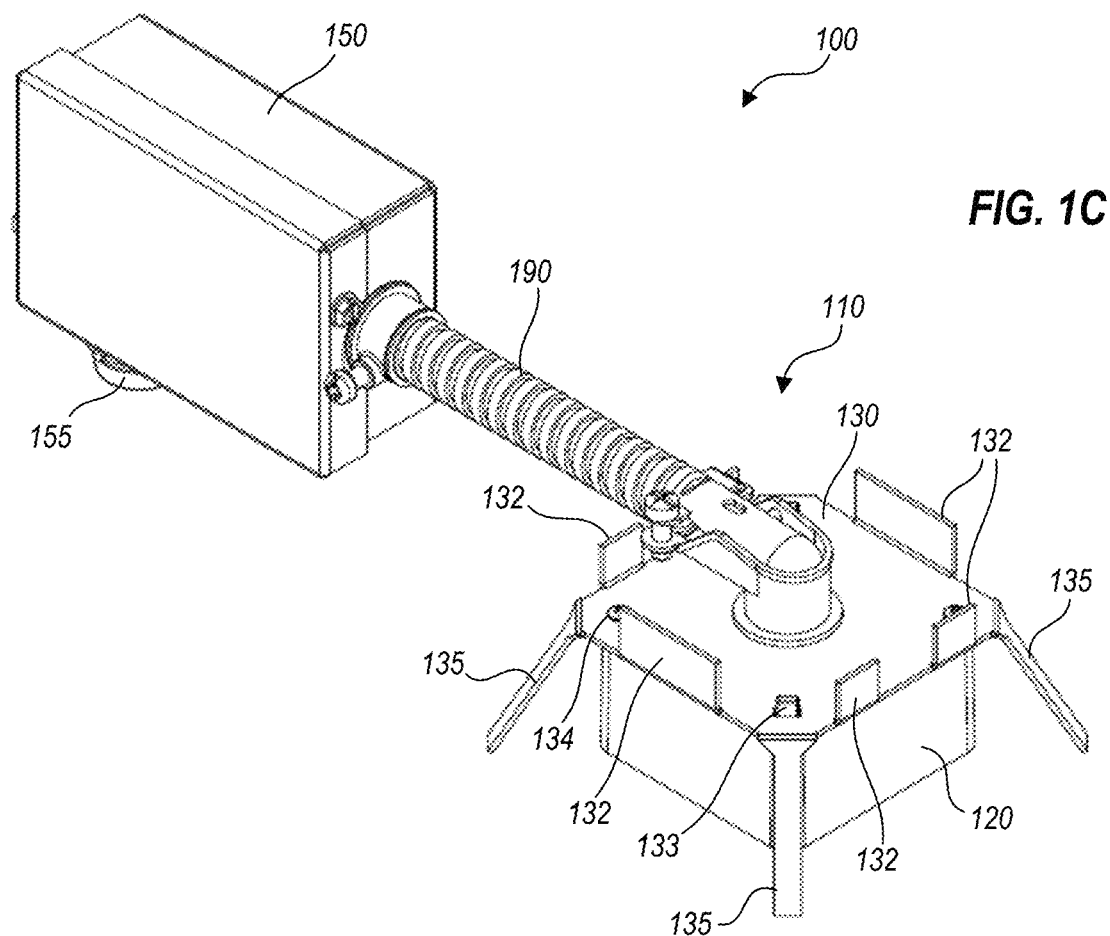
FIG. 1C is a perspective view of the self-contained positioning assembly of FIG. 1A.
Figure 1D:
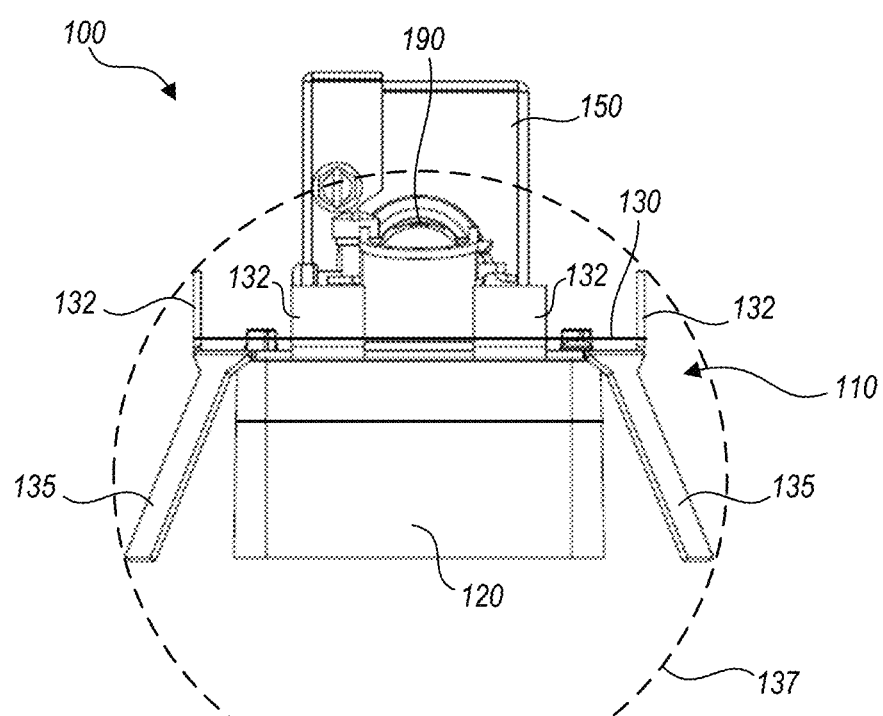
FIG. 1D is an end view of the self-contained positioning assembly of FIG. 1A.

A self-contained positioning assembly 100, in accord with one embodiment, is shown in FIGS. 1A-1D. FIG. 1A is a top plan view; FIG. 1B is a side view; FIG. 1C is a perspective view; and FIG. 1D is an end view, of positioning assembly 100. Certain ones of the features described here are blocked from view according to the different perspectives of FIGS. 1A-1D.

Positioning assembly 100 includes a positioning module 110 that couples with a wiring compartment 150 by wiring (hidden from view in FIGS. 1A-1D; see FIG. 2) that is encased in a conduit 190. Positioning module 110 houses components and circuitry for a desired positioning system, such as, but not limited to, a BLE system. More specifically, positioning module 110 includes a housing 120 in which a positioning beacon system (e.g., a BLE module and antenna, hidden within housing 120 in FIGS. 1A-1D) is disposed. Positioning module 110 is sometimes called herein a "shroud assembly." Housing 120 is preferably formed at least partially of a material such as plastic, that permits the BLE antenna within to emit signals through the housing, although other materials may also be used. Although electronic positioning beacons are described herein as BLE beacons, and positioning functionality is described as BLE positioning, the techniques and modalities described herein should be understood as applicable to other forms of electronic positioning beacons and systems, and to transmitting and/or receiving units of other types of wireless electronic systems.

In some embodiments, positioning module 110 optionally includes a support 130 that couples with an upper surface of housing 120, and has downwardly extending legs 135. While support 130 is not required, support 130 (and/or associated legs 135) can help stabilize position and orientation of housing 120. Orientation of housing 120 in the final installation is important because the signals of BLE beacons may be directional, and it has been found that best results are obtained when all BLE beacons in a single installation have a consistent orientation. This is particularly important in cases where a receiving device (e.g., smart phone, tablet or the like) moves within an area covered by the BLE beacons, from a location where BLE signal is dominated by a given one of the beacons, to a location where the signal is dominated by a different one of the beacons. Differences in azimuthal orientation (e.g., horizontal rotation of a module 110 that is seated flat on a ceiling surface) and polar orientation (e.g., tipping of a module 110 relative to a ceiling surface) are both important. Perfect orientation (e.g., within a fraction of a degree) is not required, but performance degradation can sometimes be noticed when orientation of a module is off by more than about 2 degrees, 5 degrees or 10 degrees in the azimuthal or polar directions.

Thus, to enhance the ability to orient modules 110 consistently, legs 135 may be advantageously formed with edges capable of catching against, digging into, or providing friction against, surface materials commonly used in ceilings, such as ceiling tile material or cardboard surfaces of wallboard. This provides positioning module 110 with some resistance to being moved, once placed on such a surface. Legs 135 may advantageously adjoin support 130 at corners thereof so that ends of legs 135 can provide good mechanical leverage over positioning module 110.

Support 130 may couple with housing 120 at attachment points 133, 134; not all instances of attachment points 133, 134 are labeled within the drawings, for clarity of illustration. Attachment points 133, 134 may be arranged to cooperate with housing 120 so as to constrain orientation of housing 120 relative to support 130 to only one or two possible orientations. For example, FIGS. 1A and 1C illustrate attachment points 133 as rectangular slots in support 130 configured to receive tabs of housing 120, and attachment points 134 as screws extending through circular apertures in support 130 and engaging housing 120. Each of attachment points 133, 134 is arranged at diagonals of support 130 so that only two possible orientations of housing 120 relative to support 130 are possible. Other configurations of attachment points may limit housing 120 to a single orientation relative to support 130.

Support 130 may also include optional tabs 132 (labeled only in FIGS. 1B through 1F) that serve as keying features for attachment of conduit 190, to help maintain positioning module 110 in a correct orientation, as described further below. Support 130 may be made of any suitably rigid material, such as metal or hard plastic. Support 130 may be formed of a single sheet of material, by first stamping or milling the sheet into a central plate of support 130, with legs 135 and, optionally, tabs 132 extending outwardly therefrom. Then, legs 135 and optionally tabs 132 may be bent to desired angles, and apertures for wiring (see, e.g., wiring 164, FIG. 2) and/or for coupling housing 120 with support 130 can be formed (e.g., by punching and/or drilling). Alternatively, support 130 may be formed in its finished shape by molding, casting or the like.

Self-contained positioning assembly 100 will generally be deployed above a ceiling of a space in which the ability to locate through BLE beacons is desirable (see, e.g., FIGS. 1E, 1F, 3 and 4). While the emitted BLE signal will be directed generally downwardly towards an environment below the ceiling, the signal will also have a lateral component. Thus, to the extent support 130 is provided and is made out of a signal blocking material such as metal, it may be desirable for legs 135 to be narrow so as not to interfere with the BLE signal emanating laterally from housing 120. For example, in the embodiment shown in FIGS. 1A-1D, legs 135 are about 10% as wide as housing 120. In other embodiments, this ratio can be as low as about 4% (below which, structural integrity of legs 135 may become questionable) or as high as about 20% (above which, interference with the BLE signal may become problematic).

FIG. 1D additionally illustrates a circle 137 through which all portions of positioning module 110 can fit, for installation through a ceiling or wall aperture from the room side. That is, the furthest extents of all portions of module 110, such as legs 135, housing 120 and tabs 132, can fit within circle 137 so that during installation, if needed, positioning module 110 can be pushed through a circular aperture without damaging edges of the aperture or components of module 110. Similarly, wiring compartment 150 meets the same limitation as module 110, in the understanding that conduit 190 can be flexed so as to maneuver module 110 and wiring compartment 150 sequentially through an aperture. In embodiments, module 110 can fit within a circle 137 that has a diameter of up to 1.5 inches, up to 2.0 inches, up to 2.5 inches, up to 3.0 inches, up to 3.5 inches, up to 4.0 inches, up to 5.0 inches or up to 6.0 inches in diameter so as to allow positioning module 110 to pass through corresponding apertures that are 1.5 inches, 2 inches, 2.5 inches, 3 inches, 3.5 inches, 4 inches, 5 inches or 6 inches in diameter. Extents of all portions of modules 110 and/or wiring compartments 150 can be made still smaller than the apertures through which they are designed to fit, and the corresponding apertures may have smaller, larger or intermediate values to those listed.

Figure 1E:
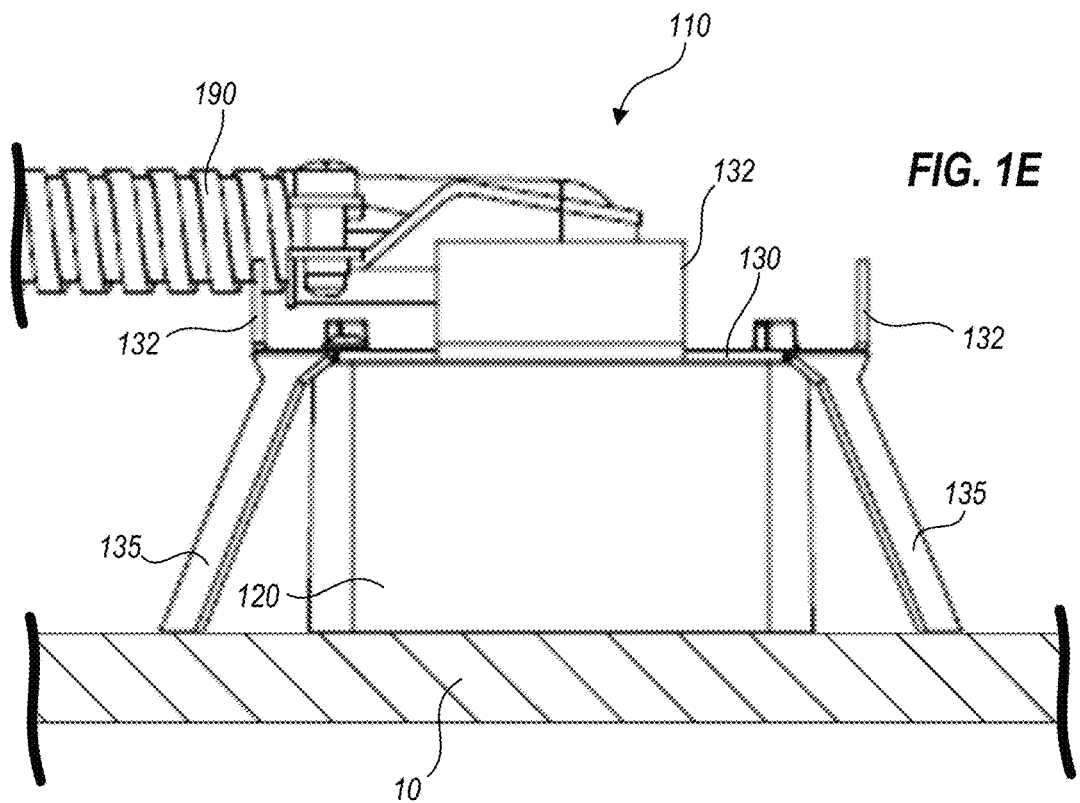
FIG. 1E is an enlarged illustration of the positioning module of FIGS. 1A-1D disposed atop a portion of a ceiling.
Figure 1F:
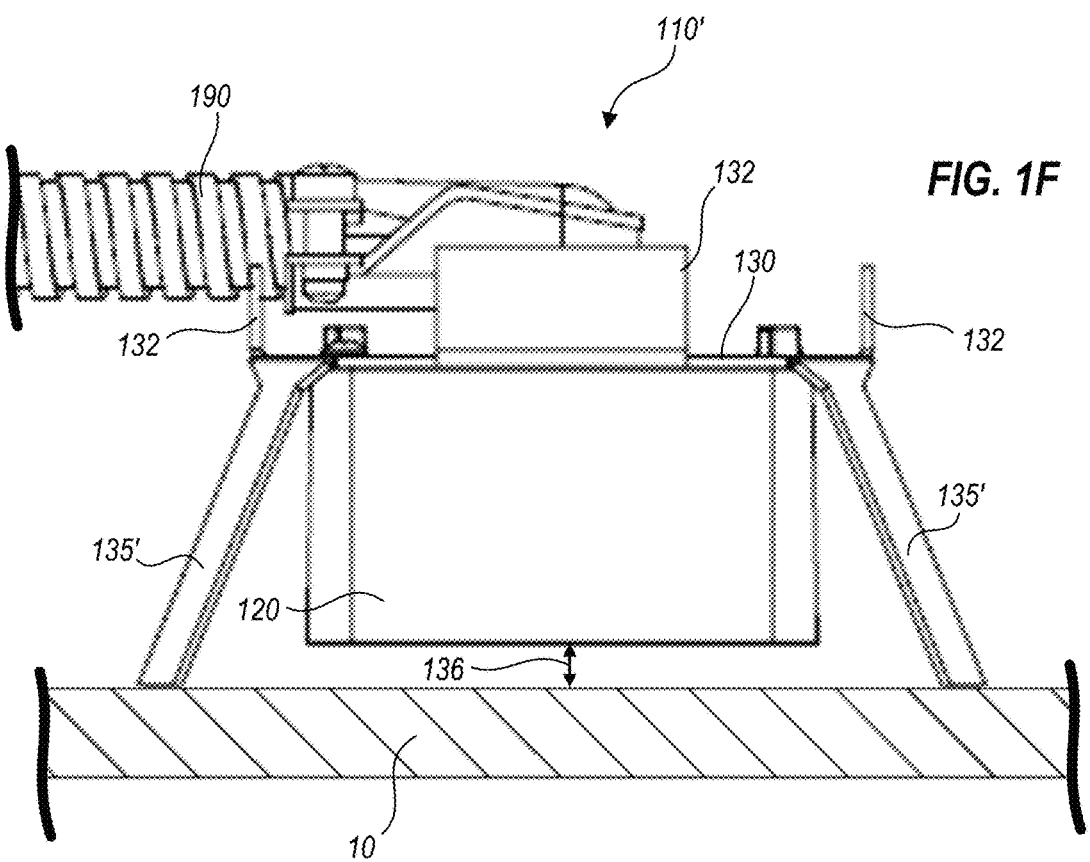
FIG. 1F is an enlarged illustration of a positioning module disposed atop a portion of a ceiling, in accord with one or more embodiments.

FIGS. 1E and 1F are enlarged illustrations of positioning module 110 and a positioning module 110', respectively, disposed atop a portion of a ceiling 10. In FIG. 1E, legs 135 are formed with a vertical extent exactly equal to a height of housing 120, such that when legs 135 contact ceiling 10, housing 120 also contacts ceiling 10. Formed and arranged as shown in FIG. 1E, legs 135 of positioning module 110 at least provide some stability with respect to position and rotation of housing 120. In FIG. 1F, legs 135' are formed with a vertical extent that is slightly greater than a height of housing 120, such that when legs 135 contact ceiling 10, housing 120 is suspended by support 130 over ceiling 10. Formed and arranged as shown in FIG. 1F, legs 135' of positioning module 110' also provide stability with respect to position and rotation of housing 120, and gap 136 formed between housing 120 and ceiling 10 may be advantageous for dissipating heat from housing 120. It is to be understood that positioning module 110' can be substituted freely for positioning module 110 within any positioning assembly 100 disclosed herein.

Figure 2:
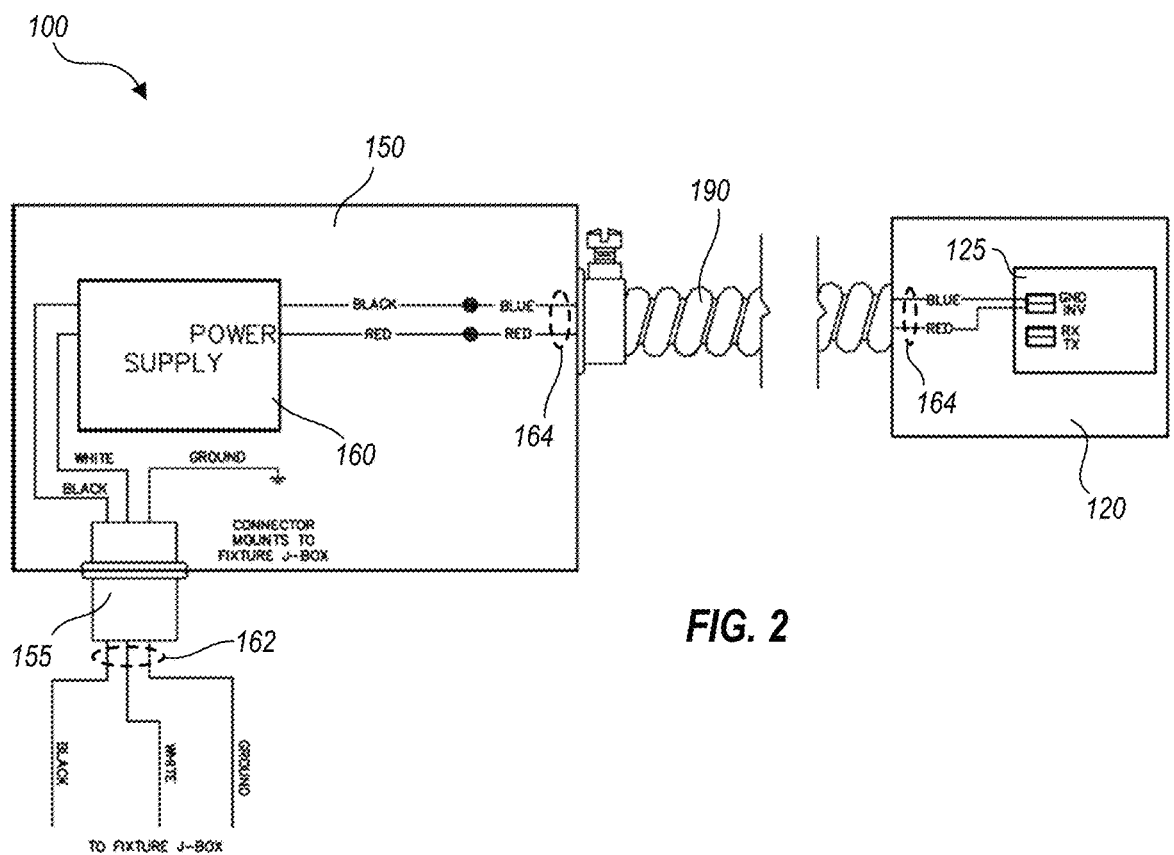
FIG. 2 is a schematic wiring diagram of the self-contained positioning assemblies of FIGS. 1A-1E or FIG. 1F.

FIG. 2 is a schematic wiring diagram of self-contained positioning assembly 100. Wiring compartment 150 may include a fitting 155 configured to interface with a junction box (typically the same junction box from which an associated luminaire is connected to external power, such as 110V to 240V AC power). Wiring compartment 150 receives external power through wires 162, optionally routed through fitting 155, and couples the external power into a power supply 160. Power supply 160 converts the external power to a type (e.g., AC to DC), and to a low voltage and/or low current power appropriate for powering an electronic positioning beacon, provided by a positioning system 125 within housing 120. For example, voltage output of power supply 160 may be 48 volts, 24 volts, 12 volts, 10 volts, 5 volts, 3 volts, 1.5 volts, 1.2 volts, 1 volt or any intermediate value between these voltages. Power supply 160 may provide power that operates as a voltage source with a maximum current, or power that operates as a current source with a maximum voltage. Low voltage (e.g., 48V, 24V or less) power may be advantageous so that electrical or fire code constraints on shielding or connecting such power may be avoided. Wiring 164 then routes the low voltage and/or low current power from power supply 160, through conduit 190, to positioning system 125 within positioning module 110. In certain embodiments, wiring 164 includes light duty wires (e.g., 20 gauge) that benefit from protection afforded by conduit 190 in commercial installations, but wiring 164 may also include heavier duty wires and/or multi-conductor cables. While conduit 190 may be rigid, inclusion of a flexible conduit 190 permits the positioning module 110 to be placed around existing obstacles (e.g., other articles of infrastructure that lie above a ceiling) and into desired locations and orientations. Conduit 190 may be made of metal, such as steel or aluminum, or in some cases may be made of plastic or other materials as permitted by applicable electrical and fire codes.

In use, wiring compartment 150 electrically couples (and in some embodiments, mechanically couples, through fitting 155) with junction box 60 atop ceiling 10. The same junction box 60 may, but need not, also power luminaire 50. As shown in FIG. 2, a power supply 160 converts external power (e.g., high voltage AC) provided by junction box 60 to low voltage, low current and/or DC power for positioning system 125 provided in housing 120 of the positioning module. Positioning module 110 of self-contained positioning assembly 100 may be placed on an upper surface of ceiling 10 at a desired location.

In certain embodiments, positioning systems 125 within positioning modules 110 provide only outgoing signals that may be picked up by user devices, while in other embodiments positioning systems 125 facilitate full, two-way Bluetooth connections with user devices. However, interfering signals between adjacent electronic positioning beacons can be problematic, especially when two-way Bluetooth connections are desirable. This kind of interference can be minimized by ensuring that each positioning module 110 in an installation is oriented in the same direction and that each is level (e.g., parallel with a ceiling or other surface on which each is mounted).

Certain features of self-contained positioning assemblies 100 herein help to facilitate orientation and planarity of positioning modules 110, irrespective of position or orientation of a wiring compartment 150 that each connects with. For example, in certain embodiments conduit 190 can be bent by hand, but keeps its shape after bending. This permits positioning modules 110 of each assembly to be maneuvered into a desired position and orientation. In some installations, it may be desirable to locate the positioning modules 110 adjacent the luminaires in the installation (e.g., as shown in FIGS. 3, 4, 5A and 5B). However, positioning modules 110 need not be situated adjacent luminaires in all installations, and it is not necessary that a luminaire be present at all.

FIGS. 3, 4, 5A and 5B illustrate how position and/or angular orientation of positioning module 110 may be adjusted using a flexible conduit 190, relative to a position and/or orientation of wiring compartment 150.

Figure 3:
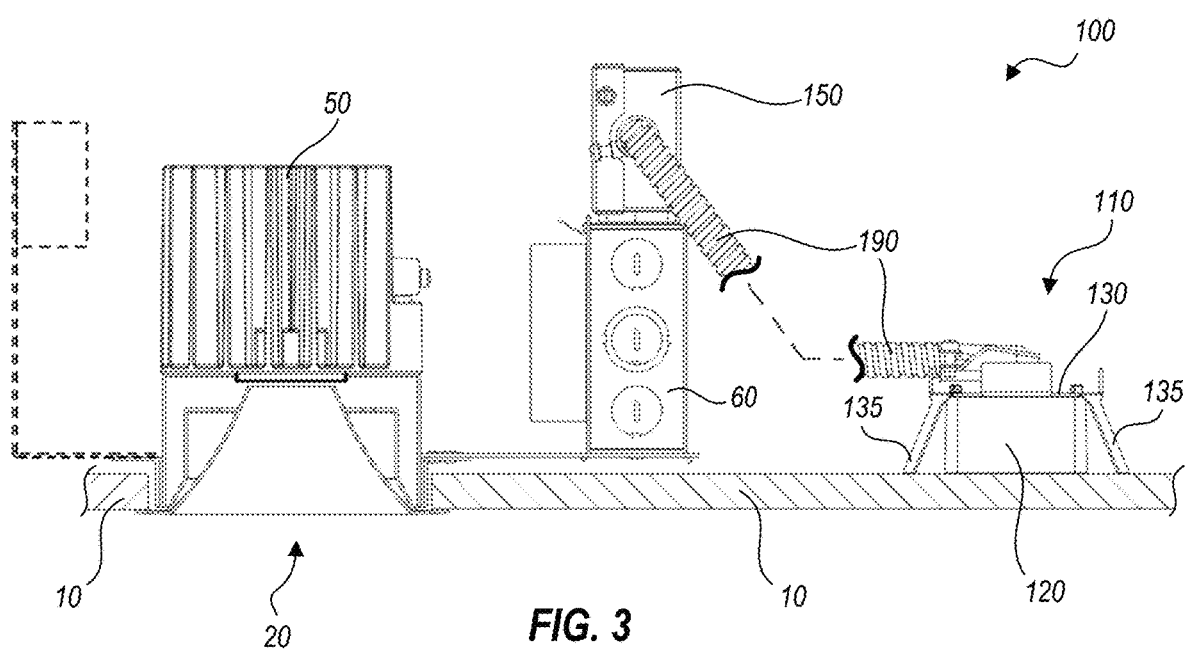
FIG. 3 is a schematic cross-sectional drawing that illustrates a self-contained positioning assembly co-installed above a ceiling with a luminaire, in accord with one or more embodiments.
Figure 4:
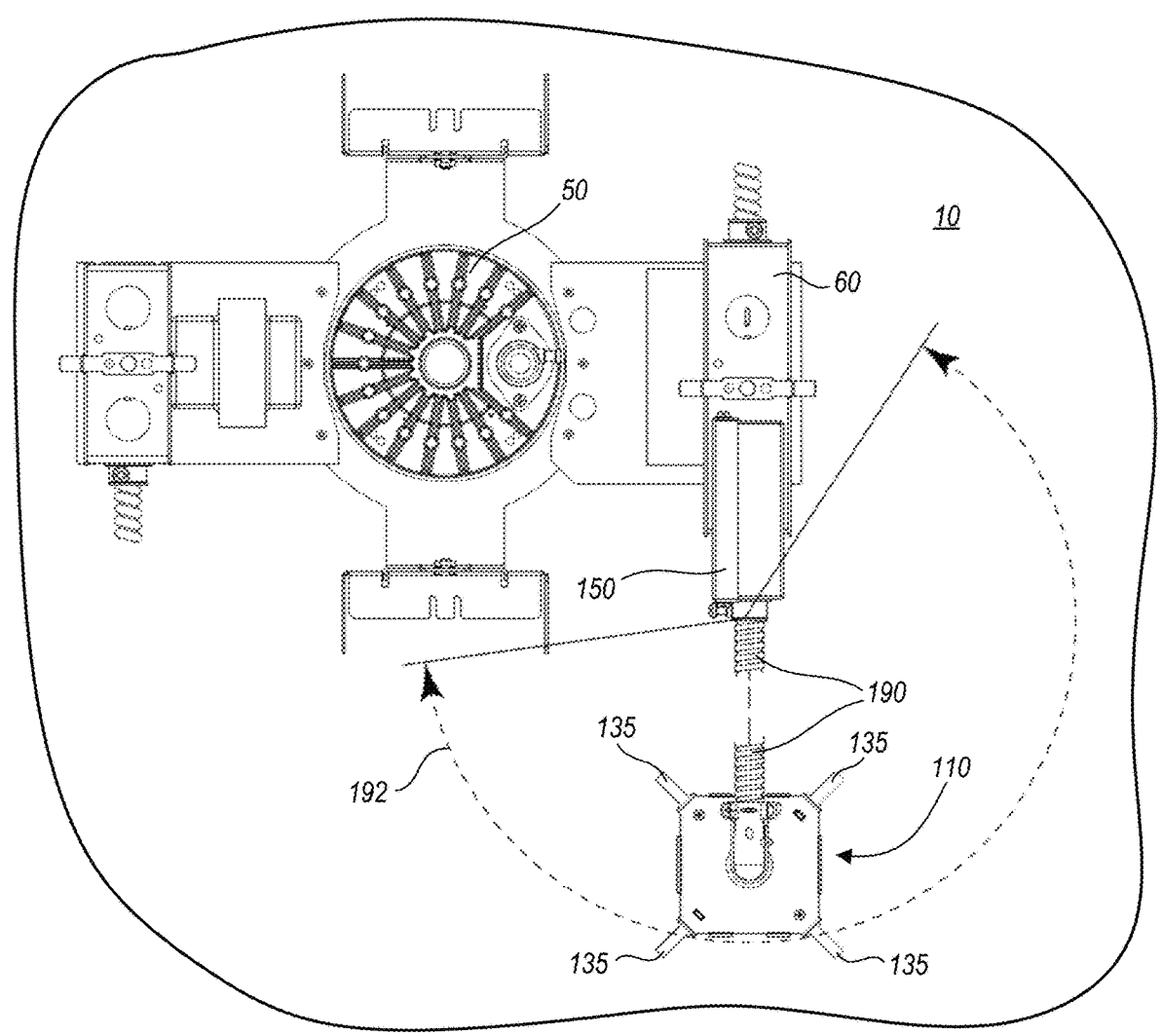
FIG. 4 is a schematic plan view drawing that illustrates the self-contained positioning assembly co-installed above a ceiling with a luminaire, that is shown in cross-sectional view in FIG. 3.

FIG. 3 is a schematic cross-sectional view, and FIG. 4 is a schematic plan view, that each illustrate self-contained positioning assembly 100, co-installed above a ceiling 10 with a luminaire 50. Luminaire 50 is installed within an aperture 20 of ceiling 10, and receives external power from a junction box 60. Wiring compartment 150 of self-contained positioning assembly 100 also couples with, and receives external power from, junction box 60. In the configuration illustrated, it is advantageous for wiring compartment 150 to couple atop junction box 60, as shown, yet it is also advantageous for all legs 135 of positioning module 110 to remain in contact with ceiling 10 so that signal strength of the Bluetooth beacon is not attenuated. This can be accomplished by bending conduit 190 appropriately. Although a length of about 10 to 12 inches for conduit 190 provides sufficient flexibility for most installations, in certain embodiments, conduit 190 can be made longer to accommodate installations where there is no suitable location for positioning module 110 close to a junction box 60 to which wiring compartment 150 is to connect. As suggested by arc 192 in FIG. 4, conduit 190 can be bent within a wide range of angles so that a final, installed position and/or orientation of positioning module 110 can be set independently of a position and/or orientation of its associated wiring compartment 150.

Advantageously, external features of self-contained positioning assemblies herein are of a sufficiently small size so as to pass through an aperture 20 for installation. In embodiments, aperture 20 may be 1.5 inches, 2 inches, 2.5 inches, 3 inches, 3.5 inches, 4 inches, 5 inches or 6 inches in diameter. As discussed above, each of positioning module 110 and wiring compartment 150 can meet this constraint separately, and conduit 190 can be flexed to maneuver each of these components through the required aperture. Although new construction usually allows access from above and below an eventual ceiling surface, remodeling and retrofitting may not (although in grid ceilings, tiles adjacent to a tile where a light fixture is located may be removable). For remodeling and retrofitting where there is no access at all above the ceiling, a worker can remove the light fixture, pull the associated junction box down through the ceiling aperture, wire the self-contained indoor positioning apparatus to the junction box, push the junction box and the self-contained indoor positioning apparatus back up through the ceiling aperture, orient the self-contained indoor positioning apparatus, and reinstall the light fixture (or install a different light fixture).

Figure 5A:
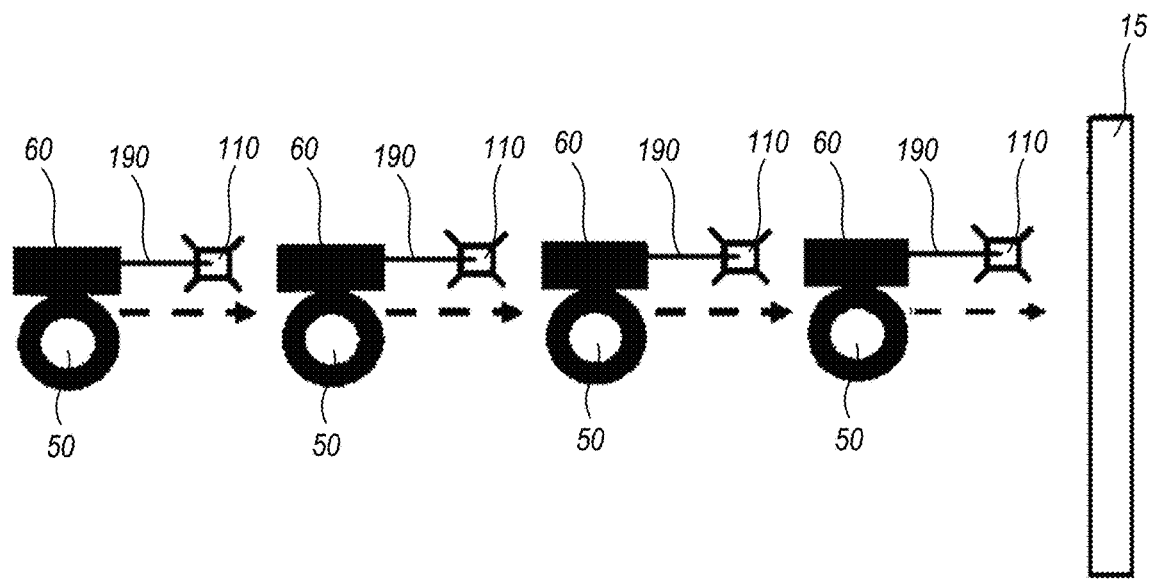
FIG. 5A is a schematic plan view that illustrates installation of four self-contained indoor positioning modules with respective luminaires that are oriented identically relative to a wall, in accord with one or more embodiments.
Figure 5B:
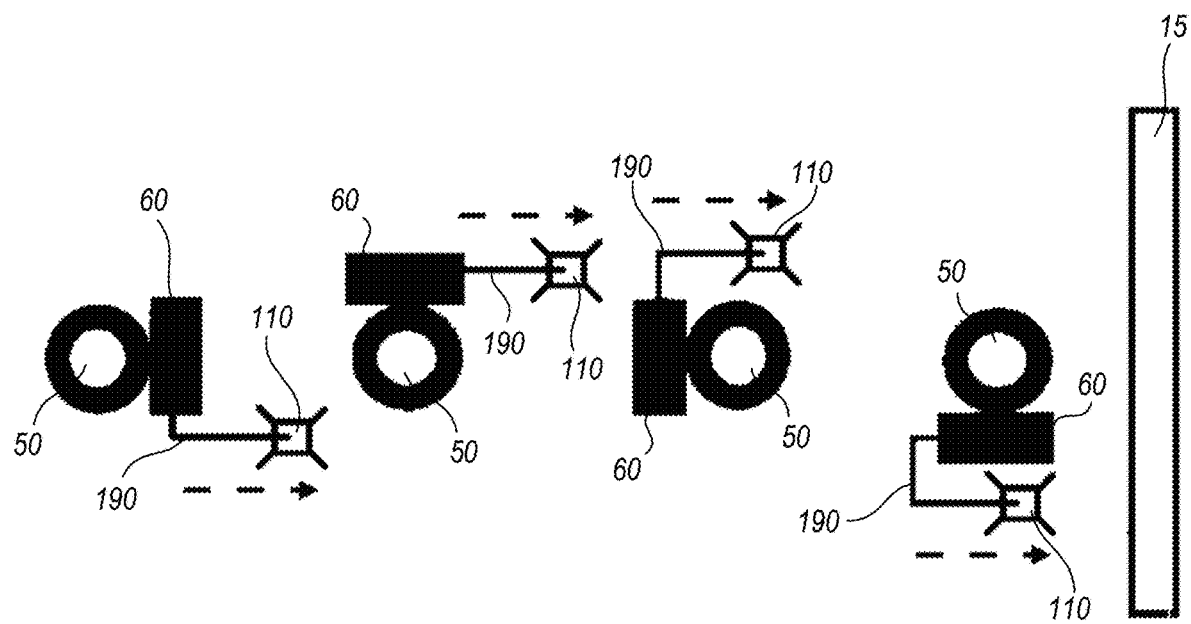
FIG. 5B is a schematic plan view that illustrates installation of four self-contained indoor positioning modules with respective luminaires that are oriented differently relative to a wall, in accord with one or more embodiments.

FIGS. 5A and 5B are schematic plan views that illustrate installation of four self-contained indoor positioning modules with respective luminaires 50 near a wall 15. In FIG. 5A, luminaires 50, and junction boxes 60 with which they are connected, are all oriented in the same direction relative to wall 15, and are sufficiently close to one another that a user device can determine positioning information in a space beneath the modules. Each self-contained indoor positioning module includes a wiring compartment (not labeled in FIGS. 5A and 5B) coupled with respective ones of junction boxes 60. Because junction boxes 60 are oriented similarly, the wiring compartments are also oriented identically relative to wall 15, thus a conduit 190 and positioning module 110 associated with each is oriented identically, as suggested by nearby broken arrows. In FIG. 5B, each junction box 60 is oriented differently relative to its associated luminaire 50 and wall 15. Each wiring compartment is oriented according to its associated junction box 60. Conduit 190 associated with each wiring compartment is bent in a different direction as needed to cause the positioning modules 110 to end up oriented identically relative to wall 15, as again suggested by nearby broken arrows. Although bends in conduit 190 are shown as right angles, and only one or two bends are shown per conduit 190 in FIG. 5B, it is to be understood that any number or type of bends can be made in conduit 190 to provide a final layout of positioning modules 110. Also, although one luminaire 50 is shown associated with each junction box 60, conduit 190 and positioning module 110 in FIGS. 5A and 5B, it is not necessary that a luminaire 50 be associated with a junction box 60 to which a wiring compartment of a self-contained indoor positioning assembly herein is coupled.

Figure 6:
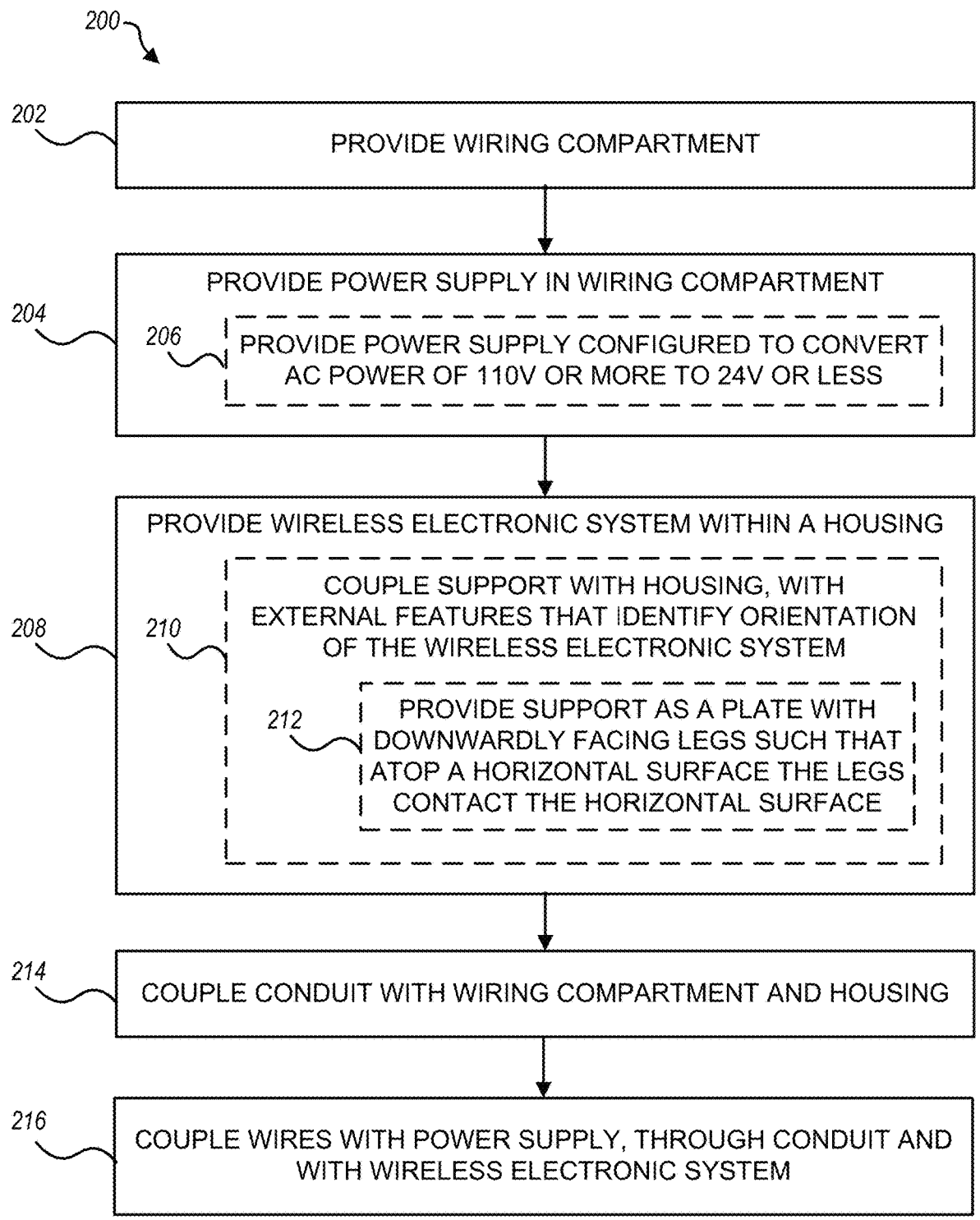
FIG. 6 is a flowchart of a method of providing a wireless electronic system, in accord with one or more embodiments.

FIG. 6 is a flowchart of a method 200 of providing a wireless electronic system, in accord with one or more embodiments. Method 200 can, for example, be used to provide self-contained positioning assembly 100 described herein. It should be understood that the steps of method 200 can be performed in sequences other than that shown in FIG. 6.

Step 202 provides a wiring compartment, for example wiring compartment 150 illustrated in FIGS. 1A-1D, FIG. 2 and elsewhere herein. Step 204 provides a power supply in the wiring compartment, for example power supply 160 illustrated in FIG. 2 and discussed elsewhere herein. An optional substep 206 provides the power supply as one that is configured to convert AC power of 110V or more, to 24V or less. Step 208 provides a wireless electronic system within a housing; the wireless electronic system may be, for example, a positioning system 125 and the housing may be housing 120, as illustrated in FIG. 2 and discussed elsewhere herein, however, other wireless electronic systems besides BLE beacons can also be provided. An optional substep 210 of step 208 couples a support with the housing, and the support has external features that correspond with an orientation of the wireless electronic system. For example, substep 210 can be exemplified as providing support 130 as illustrated in FIGS. 1A-1D and elsewhere herein, with tabs 132, legs 135 and/or the like that correspond with an orientation of positioning system 125 within housing 120. In a further substep 212 of step 208 and substep 210, the support is provided as a plate with downwardly facing legs (e.g., legs 135) such that when the housing is placed atop a horizontal surface, the legs contact the horizontal surface.

A step 214 couples a conduit, for example conduit 190, with the wiring compartment and the housing, as illustrated in FIGS. 1A-1D. Step 216 couples wiring, for example wiring 164, with the power supply, through the conduit, and with the wireless electronic system, as illustrated in FIG. 2.

Figure 7:
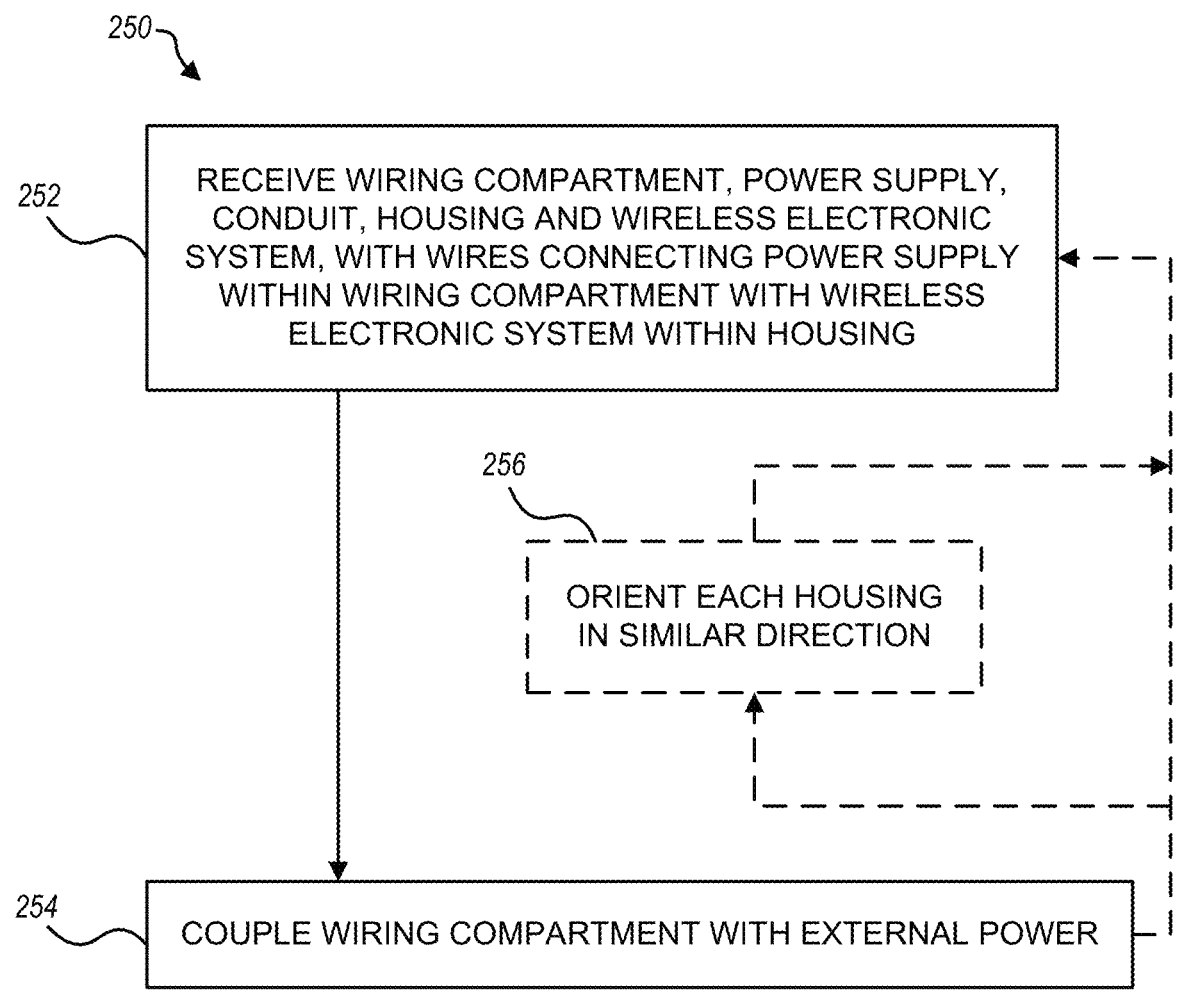
FIG. 7 is a flowchart of a method of installing a wireless electronic system, in accord with one or more embodiments.

FIG. 7 is a flowchart of a method 250 of installing a wireless electronic system, in accord with one or more embodiments. Method 250 can, for example, be used to install self-contained positioning assembly 100 described herein. It should be understood that the steps of method 200 can be performed in sequences other than that shown in FIG. 7.

Step 252 receives a wiring compartment, a power supply, a conduit, a housing and a wireless electronic system, with wiring connecting the power supply within the wiring compartment with the wireless electronic system within the housing. An example is an installer receiving wiring compartment 150, power supply 160 within wiring compartment 150, conduit 190, housing 120 and positioning system 125 within housing 120, as illustrated in FIGS. 1A-1D, FIG. 2. Step 254 couples the wiring compartment with external power; an example of step 254 is wiring power supply 160 within wiring compartment 150 to external AC mains power, as discussed in connection with FIG. 2. Steps 252 and 254 can optionally be repeated to install a plurality of self-contained indoor positioning systems sufficiently close to one another that a user device can determine position information from one or more of the systems. Still further optionally, installing the plurality of self-contained indoor positioning systems can include step 256, which orients each of the housings in a similar orientation. For example, as discussed above in connection with FIGS. 4, 5A and 5B, each positioning module 110 including housing 120 and the positioning system 125 therein, can be placed flat upon an upper surface of a ceiling, and conduit 190 can be bent so as to point each positioning module 110 in a similar direction, to improve positioning accuracy of user devices that interact with the BLE beacons.

Different arrangements of the components depicted in the drawings or described above, as well as components and steps not shown or described are possible. Similarly, some features and sub-combinations are useful and may be employed without reference to other features and sub-combinations. Examples of the invention have been described for illustrative and not restrictive purposes, and alternative examples will become apparent to readers of this patent. Accordingly, the present invention is not limited to the examples described above or depicted in the drawings, and various examples and modifications may be made without departing from the scope of the claims below.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described, are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A self-contained positioning assembly, comprising:
   a wiring compartment that is configured to receive external power;
   a power supply disposed within the wiring compartment that is configured to convert the external power to low voltage power;
   a housing;
   an electronic positioning beacon disposed within the housing, wherein the electronic positioning beacon is configured to receive the low voltage power and transmit electronic positioning signals in response thereto;
   a conduit that couples the wiring compartment with the housing;
   a metal plate that is directly coupled with an upper surface of the housing in face-to-face relation, the metal plate comprising external features that constrain azimuthal orientation of the electronic positioning beacon within the housing, relative to an end of the conduit that couples with the housing, wherein:
     the plate extends in length and width beyond a length and a width of the upper surface of the housing so as to form an overhang extending about the upper surface of the housing; and
     the plate forms a plurality of legs that extend diagonally from corners of the plate and downwardly from the plate, the legs forming a vertical height that is at least equal to a height of the housing, such that when the self-contained positioning assembly is installed atop a horizontal surface, the legs contact the horizontal surface; and
   wiring that transmits the low voltage power from the power supply, through the conduit, to the electronic positioning beacon within the housing.

2. The self-contained positioning assembly of claim 1, wherein the wiring compartment is configured to couple with a junction box, such that the external power can be received through wires that connect the power supply to wiring of the junction box.

3. The self-contained positioning assembly of claim 1, wherein:
   the conduit comprises a length; and
   the conduit is flexible so as to permit repositioning of the housing to an extent allowed by the length of the conduit.

4. The self-contained positioning assembly of claim 3, wherein the conduit can be bent by hand, but retains its shape after bending, so that the housing remains in a desired position and orientation, after the bending.

5. The self-contained positioning assembly of claim 1, wherein in operation, when the external power is AC power of 110 volts or more, the low voltage power is DC power of 24 volts or less.

6. The self-contained positioning assembly of claim 1, wherein the electronic positioning beacon operates under the Bluetooth 4.0 standard.

7. The self-contained positioning assembly of claim 1, wherein when the legs contact the horizontal surface, the housing is suspended, from the plate, above the horizontal surface.

8. A self-contained positioning assembly, comprising:
a wiring compartment that is configured to receive external power;
a power supply disposed within the wiring compartment that is configured to convert the external power to low voltage power;
a housing;
a support coupled with the housing, the support comprising external features that correspond to an orientation of an electronic positioning beacon within the housing,
an electronic positioning beacon disposed within the housing, wherein the electronic positioning beacon is configured to receive the low voltage power and transmit electronic positioning signals in response thereto;
a conduit that couples the wiring compartment with the housing; and
wiring that transmits the low voltage power from the power supply, through the conduit, to the electronic positioning beacon within the housing;
wherein:
the support includes a plate that couples with the conduit and with an upper surface of the housing,
the plate extends in length and width beyond a length and a width of the upper surface of the housing,
the external features include a plurality of legs that extend downwardly from the plate, such that when the self-contained positioning assembly is installed atop a horizontal surface, the legs contact the horizontal surface, and
a width of each of the plurality of legs is between 4% and 20% of a width of the housing.

9. A self-contained positioning assembly, comprising:
a wiring compartment that is configured to receive external power;
a power supply disposed within the wiring compartment that is configured to convert the external power to low voltage power;
a housing;
an electronic positioning beacon disposed within the housing, wherein the electronic positioning beacon is configured to receive the low voltage power and transmit electronic positioning signals in response thereto;
a conduit that couples the wiring compartment with the housing;
a metal plate that is directly coupled with an upper surface of the housing in face-to-face relation, the metal plate comprising external features that constrain azimuthal orientation of the electronic positioning beacon within the housing, relative to an end of the conduit that couples with the housing, wherein:
the plate extends in length and width beyond a length and a width of the upper surface of the housing so as to form an overhang extending about the upper surface of the housing,
the plate forms a plurality of legs that extend downwardly from the plate, the legs forming a vertical height that is at least equal to a height of the housing, such that when the self-contained positioning assembly is installed atop a horizontal surface, the legs contact the horizontal surface, and
when the legs contact the horizontal surface, the housing also contacts the horizontal surface; and
wiring that transmits the low voltage power from the power supply, through the conduit, to the electronic positioning beacon within the housing.

10. The self-contained positioning assembly of claim 9, wherein:
the conduit comprises a length; and
the conduit is flexible so as to permit repositioning of the housing to an extent allowed by the length of the conduit.

11. The self-contained positioning assembly of claim 9, wherein the conduit can be bent by hand, but retains its shape after bending, so that the housing remains in a desired position and orientation, after the bending.

12. A self-contained positioning assembly, comprising:
a wiring compartment that is configured to receive external power;
a power supply disposed within the wiring compartment that is configured to convert the external power to low voltage power;
a housing;
a support coupled with the housing, the support comprising external features that correspond to an orientation of an electronic positioning beacon within the housing;
an electronic positioning beacon disposed within the housing, wherein the electronic positioning beacon is configured to receive the low voltage power and transmit electronic positioning signals in response thereto;
a conduit that couples the wiring compartment with the housing; and
wiring that transmits the low voltage power from the power supply, through the conduit, to the electronic positioning beacon within the housing;
wherein:
the support includes a plate that couples with the conduit and with an upper surface of the housing,
the plate extends in length and width beyond a length and a width of the upper surface of the housing, and
the plate forms upwardly facing tabs such that when the conduit couples the wiring compartment with the housing, the tabs constrain an orientation of the conduit relative to the housing.

13. The self-contained positioning assembly of claim 12, wherein:
the conduit comprises a length; and
the conduit is flexible so as to permit repositioning of the housing to an extent allowed by the length of the conduit.

14. The self-contained positioning assembly of claim 12, wherein the conduit can be bent by hand, but retains its shape after bending, so that the housing remains in a desired position and orientation, after the bending.

15. The self-contained positioning assembly of claim 12, wherein:
the plate forms a plurality of legs that extend downwardly from the plate, the legs forming a vertical height that is at least equal to a height of the housing;
such that when the self-contained positioning assembly is installed atop a horizontal surface, the legs contact the horizontal surface; and
when the legs contact the horizontal surface, the housing is suspended, from the plate, above the horizontal surface.

16. A method of providing an electronic positioning beacon system, comprising:
providing a wiring compartment that is configured to receive external power;

providing a power supply within the wiring compartment, wherein the power supply is configured to convert the external power to low voltage power;

providing a housing and an electronic positioning beacon disposed within the housing, wherein the electronic positioning beacon is configured to receive the low voltage power and transmit electronic positioning signals in response thereto;

coupling a support with the housing, wherein the support includes one or more external features that identify an orientation of the electronic positioning beacon within the housing; wherein coupling the support comprises:
    providing a plate that forms downwardly facing legs that extend diagonally from corners of the plate, wherein the legs form a vertical height that is at least equal to a height of the housing, and
    coupling the plate in face-to-face relation with an upper surface of the housing, such that when the housing is positioned atop a horizontal surface, the legs contact the horizontal surface;

coupling a conduit with the wiring compartment and with the housing; and coupling wiring with the power supply, through the conduit, and with the electronic positioning beacon, to enable transmission of the low voltage power from the power supply, through the wiring, to the electronic positioning beacon.

17. The method of claim 16, wherein the conduit is flexible so as to permit repositioning of the housing relative to the wiring compartment.

18. The method of claim 16, wherein providing the power supply comprises providing a power supply configured to convert AC power of 110 volts or more to low voltage power of 24 volts or less.

19. A self-contained positioning assembly, comprising:
    a wiring compartment that is configured to receive external power;
    a power supply disposed within the wiring compartment that is configured to convert the external power to low voltage power;
    a plastic housing that forms one or more attachment points;
    a support that couples with the plastic housing at the one or more attachment points, wherein the support comprises:
        a plate disposed immediately above the plastic housing such that the plastic housing is in contact with a lower side of the plate, and the plate extends azimuthally beyond all sides of the plastic housing,
        legs that extend outwardly from corners of the plate, the legs forming downward angles with respect to the plate such that the legs are disposed laterally with respect to the plastic housing,
        and wherein cooperation between the attachment points and the plastic housing constrains azimuthal orientation of the plastic housing relative to the plate, and the legs extend at least as far downward as a height of the plastic housing;
    a conduit that couples the wiring compartment with the plate, wherein the conduit couples with an upper side of the plate;
    an electronic positioning beacon disposed within the plastic housing, wherein the electronic positioning beacon is configured to receive the low voltage power and transmit electronic positioning signals in response thereto, and orientation of the electronic positioning beacon can be adjusted by adjusting placement of the legs atop an installation surface; and
    wiring that transmits the low voltage power from the power supply, through the conduit, to the electronic positioning beacon within the plastic housing.

20. The self-contained positioning assembly of claim 19, wherein:
    the conduit comprises a length; and
    the conduit is flexible so as to permit repositioning of the housing to an extent allowed by the length of the conduit.

21. The self-contained positioning assembly of claim 19, wherein the conduit can be bent by hand, but retains its shape after bending, so that the housing remains in a desired position and orientation, after the bending.

22. The self-contained positioning assembly of claim 19, wherein when the legs contact the installation surface, the housing is suspended, from the plate, above the installation surface.

* * * * *